(12) United States Patent
Børsheim et al.

(10) Patent No.: US 11,201,363 B2
(45) Date of Patent: Dec. 14, 2021

(54) COOLING SYSTEM AND METHOD

(71) Applicant: SIEMENS ENERGY AS, Oslo (NO)

(72) Inventors: Eirik Børsheim, Oslo (NO); Tore Berge, Trondheim (NO)

(73) Assignee: SIEMENS ENERGY AS, Oslo (NO)

( * ) Notice: Subject to any disclaimer, the term of this patent is extended or adjusted under 35 U.S.C. 154(b) by 319 days.

(21) Appl. No.: 16/499,263

(22) PCT Filed: Mar. 29, 2018

(86) PCT No.: PCT/EP2018/058146
§ 371 (c)(1),
(2) Date: Sep. 28, 2019

(87) PCT Pub. No.: WO2018/185001
PCT Pub. Date: Oct. 11, 2018

(65) Prior Publication Data
US 2020/0028221 A1    Jan. 23, 2020

(30) Foreign Application Priority Data

Apr. 5, 2017  (GB) .................................... 1705521
Apr. 5, 2017  (GB) .................................... 1705523

(51) Int. Cl.
*H01M 10/613*    (2014.01)
*H01M 10/6556*   (2014.01)
(Continued)

(52) U.S. Cl.
CPC .......... *H01M 10/613* (2015.04); *H01G 11/10* (2013.01); *H01G 11/18* (2013.01);
(Continued)

(58) Field of Classification Search
CPC ........... H01M 10/613; H01M 10/6556; H01M 10/6568; H01M 10/0525; H01M 2200/10; H01G 11/10; H01G 11/18
See application file for complete search history.

(56) References Cited

U.S. PATENT DOCUMENTS 6,605,922 B2    8/2003  Tamai et al.
8,917,039 B2   12/2014  Yugo
(Continued)

FOREIGN PATENT DOCUMENTS

JP    2008251263 A    10/2008
JP    2013099002 A     5/2013
(Continued)

OTHER PUBLICATIONS

International search report and written opinion dated Jul. 13, 2018, for corresponding PCT/EP2018/058146.

*Primary Examiner* — Stewart A Fraser

(57) ABSTRACT

Additional cooling is provided to an energy storage module of a cooling system with a plurality of cooling channels in contact with a surface of an energy storage device, by pipe connections of a common cooling fluid outlet pipe that have a lower melting point than pipe connections of the common cooling fluid inlet pipe. In use, if the pipe connections are subjected to elevated temperatures, or fire, the pipe connections of the common fluid outlet pipe fail before the pipe connections of the common fluid inlet pipe, causing a pressure drop, whereby the rate of fluid flow through the cooler of the energy storage module in which the pipe connection has failed is substantially increased.

16 Claims, 7 Drawing Sheets

(51) Int. Cl.
*H01M 10/6568* (2014.01)
*H01M 10/0525* (2010.01)
*H01G 11/10* (2013.01)
*H01G 11/18* (2013.01)

(52) U.S. Cl.
CPC ... *H01M 10/0525* (2013.01); *H01M 10/6556* (2015.04); *H01M 10/6568* (2015.04); *H01M 2200/10* (2013.01)

(56) References Cited

U.S. PATENT DOCUMENTS

| | | |
|---|---|---|
| 9,306,409 B2 | 4/2016 | Yoo |
| 2009/0087727 A1 | 4/2009 | Harada et al. |
| 2010/0136391 A1 | 6/2010 | Prilutsky et al. |
| 2011/0200856 A1* | 8/2011 | Yasui ............... H01M 10/425 429/88 |
| 2013/0177791 A1 | 7/2013 | Takahashi et al. |
| 2015/0340745 A1* | 11/2015 | Inoue ............... H01M 10/625 429/120 |
| 2016/0104925 A1* | 4/2016 | Xiang ............... H01M 10/613 429/82 |
| 2016/0204483 A1 | 7/2016 | Schilder et al. |
| 2018/0191038 A1* | 7/2018 | Li ..................... H01M 10/6552 |

FOREIGN PATENT DOCUMENTS

| | | |
|---|---|---|
| JP | 2015037043 A | 2/2015 |
| KR | 20030044861 A | 6/2003 |
| KR | 20140019629 A | 2/2014 |

\* cited by examiner

COOLING SYSTEM AND METHOD

CROSS REFERENCE TO RELATED APPLICATIONS

This application is the US National Stage of International Application No. PCT/EP2018/058146 filed Mar. 29, 2018, and claims the benefit thereof. The International Application claims the benefit of United Kingdom Application Nos. GB 1705521.1 and GB 1705523.7, both filed Apr. 5, 2017. All of the applications are incorporated by reference herein in their entirety.

FIELD OF INVENTION

This invention relates to a cooling system and method for an energy storage module, in particular for an energy storage module comprising an electrochemical cell, or battery, providing electrical energy to an end user.

BACKGROUND OF INVENTION

Stored electrical energy modules, or power units of various types are becoming increasingly common in many applications, in particular for use where there are environmental concerns relating to emissions in sensitive environments, or public health concerns. Stored electrical energy power units are typically used to provide electrical energy to operate equipment, to avoid emissions at the point of use, although that stored energy may have been generated in many different ways. Stored electrical energy may also be used to provide peak shaving in systems otherwise supplied from the grid, or from various types of power generation system, including diesel generators, gas turbines, or renewable energy sources. Aircraft, vehicles, vessels, offshore rigs, or rigs and other powered equipment in remote locations are examples of users of large scale stored electrical energy. Vehicle drivers may use the stored energy power unit in city centres and charge from an internal combustion engine on trunk roads, to reduce the harmful emissions in the towns and cities, or they may charge up from an electricity supply. Ferries which carry out most of their voyage relatively close to inhabited areas, or in sensitive environments are being designed with hybrid, or fully electric drive systems. Ferries may operate with stored energy to power the vessel when close to shore, using diesel generators offshore to recharge the batteries. In some countries the availability of electricity from renewable energy sources to use to charge the stored energy unit means that a fully electric vessel may be used, provided that the stored energy units are sufficiently reliable for the distances being covered, with no diesel, or other non-renewable energy source used at all. Whether hybrid, or fully electric, the stored energy units may be charged from a shore supply when docked. The development of technology to achieve stored energy units that are reliable enough for prolonged use as the primary power source must address certain technical issues.

SUMMARY OF INVENTION

In accordance with a first aspect of the present invention, an energy storage module cooling system for a power supply system comprising one or more energy storage modules arranged in parallel; the cooling system comprising a cooling unit comprising a cooling fluid reservoir, a common cooling fluid inlet pipe and a common cooling fluid outlet pipe; wherein each energy storage module comprises one or more energy storage devices; and for each energy storage device, a cooler in contact with the energy storage device; wherein the cooler comprises one or more cooling fluid channels for circulating cooling fluid, the channels being in direct contact with a surface of the energy storage device, each cooling fluid channel being adapted to receive cooling fluid, extract heat from the energy storage device and return the cooling fluid to the cooling unit; and wherein the common cooling fluid inlet pipe and common fluid outlet pipe comprise pipe connections between each energy storage device cooler; wherein the pipe connections of the common cooling fluid outlet pipe have a lower melting point than pipe connections of the common cooling fluid inlet pipe.

In normal operation, the direct contact of the cooling channels to the cell keeps the cells at their correct operating temperature and if a thermal event causes an outlet pipe connection to exceed its melting point and fail, then cooling fluid flows at a much higher rate in the cooler in which the pipe connection has melted to provide additional cooling to that overheating cell.

The melting point of the pipe connections of the common cooling fluid inlet pipe may be chosen to be greater than 400° C.

The outlet pipe connection may be chosen to have a melting point a little above safe operating temperature, which for Li-ion is about 60° C., but advantageously the melting point of the pipe connections of the common cooling fluid outlet pipe is in the range of 130° C. to 180° C.

In one embodiment, the cooler acts as a mount, or carrier, providing support for the energy storage device. Alternatively, the cooling system may be provided with a separate mount, or carrier, in which each energy storage device and its cooler are mounted in the module.

The cooler may be formed by lamination, additive manufacturing techniques, or welding.

The cooling fluid channels may comprise pipes having a circular or square cross section.

The cooling fluid channels may comprise a polymer material.

Typically, the cooling fluid channels have a wall thickness of 1 mm to 5 mm for a polymer material, but advantageously, the cooling fluid channels have a wall thickness of no more than 3 mm.

At least 30% of one surface of the energy storage device may be in direct contact with the cooling fluid channels of the cooler.

At least 75% of one surface of the energy storage device may be in direct contact with the cooling fluid channels of the cooler.

The cooling fluid channels may further comprise one or more rupture sections having a lower melting point than the melting point of the cooling fluid channels, whereby cooling fluid is provided directly to an energy storage device in the event of the temperature exceeding the lower melting point.

The energy storage device may comprise one of an electrochemical cell, a battery cell, a fuel cell, capacitor, ultracapacitor, or a supercapacitor.

The energy storage device may comprise a Li-ion battery, NiMh battery, or alkaline battery.

The cooling fluid may comprise water or water glycol

In accordance with a second aspect of the present invention, a method of supplying additional cooling to an energy storage module of a cooling system according to the first aspect comprises providing pipe connections of the common cooling fluid outlet pipe that have a lower melting point than pipe connections of the common cooling fluid inlet pipe; such that in use, if the pipe connections are subjected to elevated temperatures, or fire, the pipe connections of the common fluid outlet pipe fail before the pipe connections of the common fluid inlet pipe, causing a pressure drop whereby the rate of fluid flow through the cooler of the energy storage module in which the pipe connection has failed is substantially increased.

The method may further comprise detecting in the cooling unit a pressure drop in the closed system and switching from the cooling fluid reservoir to an additional cooling fluid source to maintain the supply of cooling fluid for a longer period.

The additional cooling fluid source may be switched off after a predetermined time period.

BRIEF DESCRIPTION OF THE DRAWINGS

An example of cooling system and method according to the present invention will now be described with reference to the accompany drawings in which.

DETAILED DESCRIPTION OF INVENTION

Figure 1:
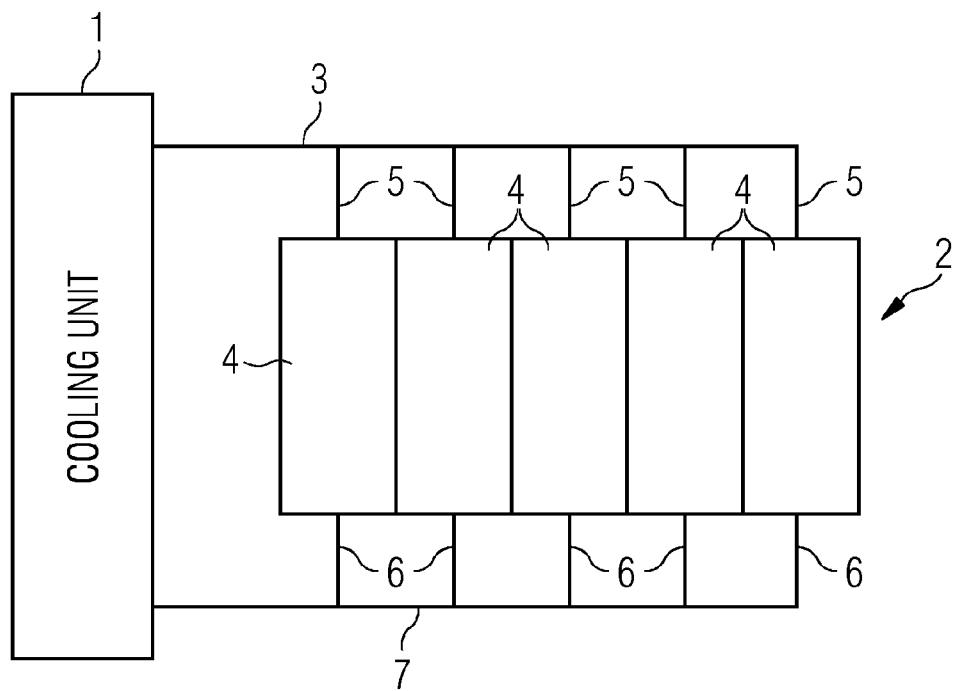
FIG. 1 is a block diagram of an example of a cooling system according to the present invention for a modular stored energy system.

Early large scale batteries were lead acid, but more recently, lithium ion batteries have been developed for electrical energy storage for large scale applications. Li-ion batteries are typically pressurised and the electrolyte is flammable, so they require care in use and storage. A problem which may occur with Li-ion batteries is thermal runaway which may be caused by an internal short circuit in a battery cell, created during manufacture. Other causes, such as mechanical damage, overcharge, or uncontrolled current may also cause thermal runaway, but the battery system design is typically adapted to avoid these. Manufacturing issues with the cells cannot be ruled out entirely, so precautions are required to minimise the effect should thermal runaway occur. In a large scale Li-ion battery system, the amount of energy that is released during a thermal runaway is a challenge to contain. A thermal event may increase temperatures in a single cell from a standard operating temperature in the range of 20° C. to 26° C. to as much as 700° C. to 1000° C. Safe operating temperatures are below 60° C., so this is a significant problem.

There are strict regulations in the marine and offshore industries regarding risk to the vessel or rig, one requirement being that there should be no transfer of excess temperature from one cell to another. If overheating occurs, then it should be contained in a single cell and not allowed to spread. In addition, for marine and offshore applications, weight and volume of any equipment is severely restricted, leading to compact, lightweight systems being advantageous. It is a challenge to produce a compact, lightweight, system that achieves the required thermal isolation and cools the cell in which excess heating occurs, quickly and efficiently. Another problem is that in a thermal event there may also be release of a large amount of flammable gasses, which may self-ignite at elevated temperatures.

The problem may be addressed by allowing whole modules to enter thermal runaway and simply controlling the resulting flames and fire with an external fire extinguishing system. In this case there are open flames in the battery space and controlling the resulting flames and fire does not ensure safe transportation and storage. Alternatively, potentially expensive insulation material may be used to thermally isolate the cells from one another, but this compromises cooling system performance and adds volume. A conventional approach is to use thick aluminium fins between each cell to provide the cooling, but this adds weight and volume and still does not ensure safe transportation and storage because heat is conducted extremely well through aluminium (>300 W/mK) and will heat neighbouring cells quickly, if not cooled. During transport and storage, cooling may not be available. The problem of release of flammable gas may be handled by providing a pressure valve in the module casing, releasing the gas at a certain pressure, either into the battery space or into a separate exhaust system. However, conventional pressure release valves are designed to burst under pressure, which leads to other problems. In addition, active cooling may be provided in the exhaust outside the module to avoid self-ignition.

In a Li-ion battery system, it is very important that the temperature of the battery cells does not exceed the prescribed operating temperature and that the cell temperature in the entire system is uniform. Sustained operation outside the prescribed operating temperature window may severely affect the lifetime of the battery cells and increases the risk of thermal runaway occurring.

For marine applications, there is a particular focus on using electrochemical energy storage modules, such as batteries, at their maximum charge or discharge rate due to cost of installation and the weight and space taken up by the modules when on a vessel or offshore platform. Furthermore, maintenance and repair, or replacement is complicated and expensive compared to land based uses of stored energy systems, so extending the lifespan of stored energy modules is particularly important. For the example of Li-ion batteries, these are sensitive to high temperature, so it is important to ensure that the operating and ambient temperature are control for all cells of a Li-ion battery system to ensure the design lifetime is met. Local variations or hot spots on a single cell may also compromise the total lifetime achievable.

A common approach for large scale, marine, or offshore, stored energy systems is to use air cooling, with air flowing between cells of a battery system. Another option is to use water cooling in combination with aluminium cooling fins. The water cooling is by flowing over heat exchangers and cooler blocks and the aluminium cooling fins are provided between each cell of the battery system. However, this system is not particularly efficient at removing heat and also adds substantial weight to the energy storage system. Aluminium is chosen for its thermal conductivity and relatively low cost, rather than its lightness. Heat from the batteries must pass to the aluminium cooling fins and those fins are then cooled by the liquid which loses its heat at the heat exchanger and is recirculated.

These systems may be acceptable for normal operation, but are unable to respond to sudden temperature increases, such as may occur during thermal runaway.

US20100136391 describes a cooling system for automotive applications in which a cooling fluid conduit in proximity with cells of a battery pack is provided with breach points, which breach at a lower temperature than the rest of the conduit to allow cooling fluid to be discharged directly onto a cell to mitigate thermal runaway.

JP2008251263 describes a system for providing a fire-extinguishing agent, or coolant to batteries which are overheating. In a power source provided with a plurality of batteries, the batteries are stacked with a gap between them into which piping is able to direct the fire extinguishing agent or coolant because heat melting parts of the piping melt at the points where the temperature exceeds a prescribed temperature, so that the fire-extinguishing agent, or coolant preferentially comes out of the pipes into the gaps between the batteries through the melted heat melting parts.

However, in both cases, the cooling effect is limited and not particularly targeted to the specific part of the battery where the thermal event starts. The present invention addresses this by forming each cell with a laminated layer of a cooling unit that provides cooling channels over the whole surface of the cell, rather than just supplying coolant from above the cell in case of a thermal event and then operating the cooling system such that a significant increase in cooling effect is provided to the cell where a thermal event is occurring. The combination of distributed cooling over the whole surface for all of the cells of the battery and rapid increase in rate of cooling allows action to be taken quickly and easily in a targeted fashion.

FIG. 1 illustrates an example of a stored energy module cooling system for cooling energy storage modules according to the invention. An energy storage module 4 typically comprises an energy storage device—in this example, a battery cell (not shown)—mounted on a cooler, either integral with, or separate from a carrier, or mount and electrically connected together in series with a neighbouring energy storage device on the next cooler, or in the next carrier. A module typically comprises between 10 and 30 energy storage devices, although more or fewer cells per module are possible. The module may further comprise a substantially gas tight enclosure, a part of which comprises a non-magnetic material. The cells are advantageously prismatic or pouch type cells to get a good packing density. Typically, a single cell has a capacity of between 20 Ah and 100 Ah, 60 Ah to 80 Ah being most common, but capacities of only a few Ah or above 100 Ah are not excluded. A plurality of energy storage modules may be electrically connected together in series, or in parallel, in an energy storage unit 2, or cubicle. A cooling unit 1 provides a cooling fluid to the modules 4 of the energy storage unit 2 via inlet pipes 3. In this example, the energy storage unit comprises a plurality of modules 4, each module supplied in parallel with cooling fluid through inlet tubes 5. Typically, the unit comprises between 9 and 21 modules, although this depends upon the application and may be up to 30, or 40, or as many as 50 modules per cubicle in some cases. The warmed cooling fluid is removed through outlet tubes 6 and returned to the cooling unit 1 via outlet pipes 7. Typically, the warmed fluid is cooled again in the cooling unit and re-circulated in a closed system.

Figure 2A:
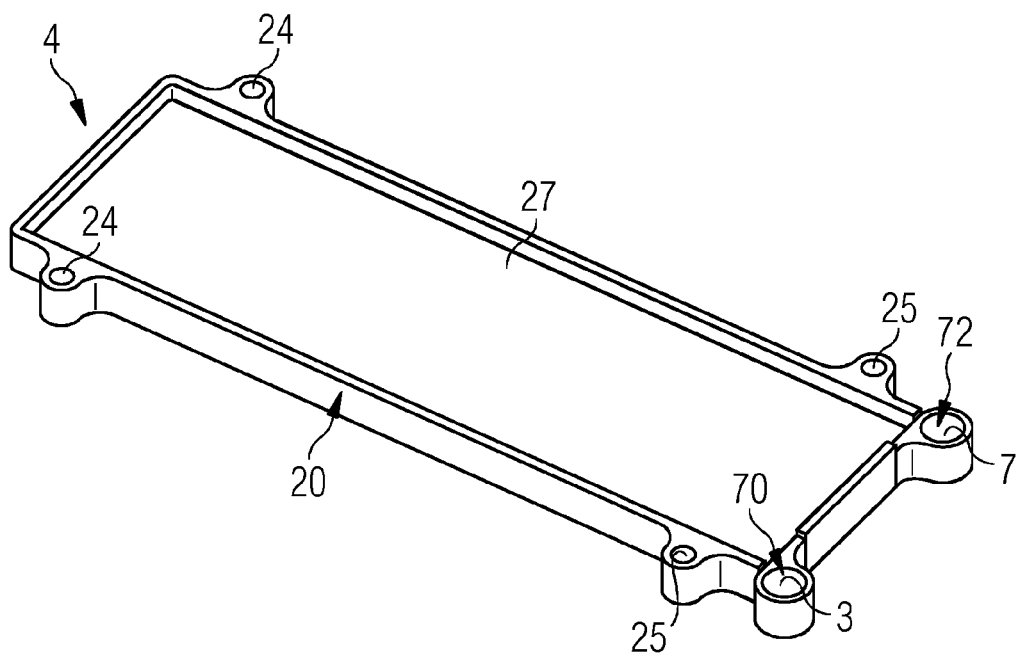
FIGS. 2a and 2b illustrate more detail of a cooler for energy storage devices using the cooling system according to of FIG. 1.
Figure 2B:
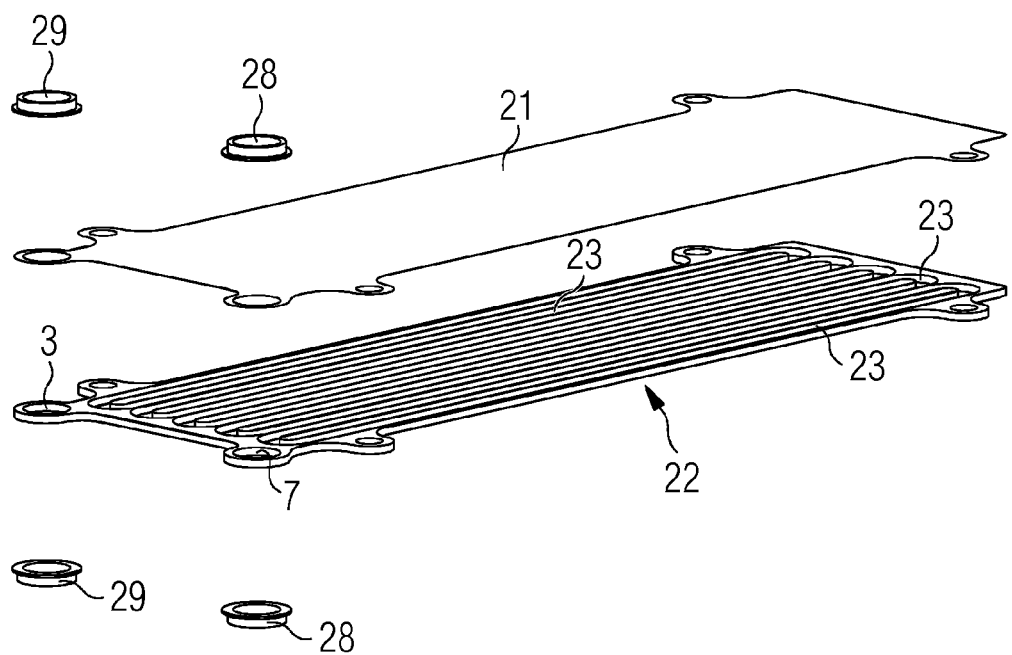

FIGS. 2a and 2b show more detail of one example of the modules 4. Each module may comprise a cooler 20 on which an energy storage device (not shown) is mounted. The cooler may be integral with, or separate from a carrier, or casing, into which an energy storage device (not shown), such as a battery cell, is fitted. An energy storage module 10 typically comprises a stack of one or more energy storage devices (not shown), for example battery cells, each mounted on a cooler 20, which also acts as a support, or carrier for the cells, shown in more detail in FIGS. 4, 5 and 6 and electrically connected together in series with a neighbouring energy storage device on the next cooler. In the examples, the cooler is an integral part of the support, but an alternative would be to have a separate support frame in which the cooler is mounted, with the energy storage device mounted on the surface of the cooler.

Figure 7:
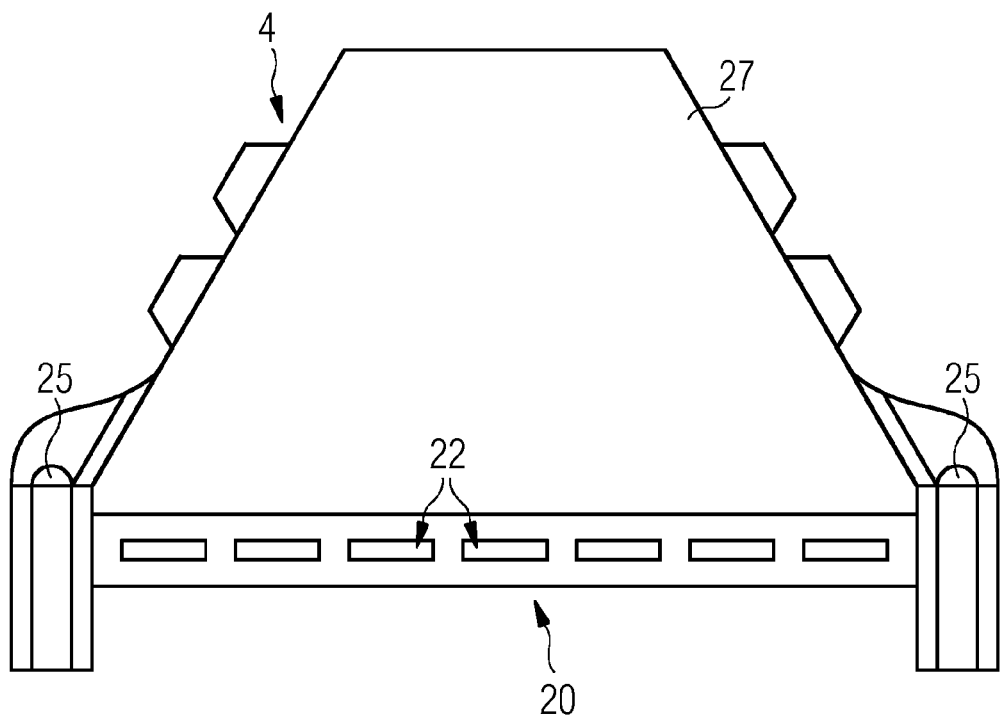
FIG. 7 shows a cross section through an example of one cooler of the stack of FIG. 4 or 5.

The cooler, or carrier, is typically made from a polymer plastics material for light weight and low cost. As shown in FIG. 2b, which is an exploded view of FIG. 2a, channels 22 of the cooler 20 may be formed by providing raised section and by laminating, or welding, a plate 21 to the series of raised sections 23. The raised sections may be formed by moulding in another piece of the same polymer plastics material and the plate 21 closes the raised sections to form cooling channels 23, or conduits, through which cooling fluid may flow from one end to another. Alternatively, the cooling channels 22 may be formed as an integral part of the cooler casing by an additive manufacturing, or other, technique, for example as can be seen in the cross section through one module 4, in FIG. 7. A battery cell may be installed in each cooler 20, or on an outer surface 27 of the cooler. The outer surface 27 of the cooling channels 22 of the cooler 20 may be in direct contact with one surface of the battery cell to provide effective cooling over a large surface area, without any direct contact of the cooling fluid to the energy storage device, or cell.

Cooling fluid flows from the inlet pipe 3 through the channels 22, or conduits of the cooler 20, cooling the cell by thermal transfer from the surface of the cell through the thin tubing 23 to the cooling fluid. The cooling fluid channels or tubing have a typical overall thickness in the range of 5 mm to 20 mm, with a wall thickness in the range of 1 mm to 5 mm and advantageously, no more than 3 mm for a polymer plastics material. The cooling fluid is carried away into the outlet pipe 7 and returned to the cooling unit 1 to be cooled again. The tubing 23 formed under plate 21 covers a substantial part of the cell surface on the side that it contacts, anything from 30% to 75% of the cell surface area on that side of the cell.

Figure 3A:
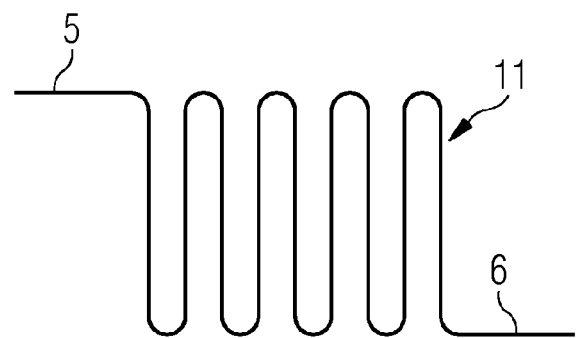
FIGS. 3a and 3b show more detail of coolers of the examples of FIGS. 1 and 2.
Figure 3B:
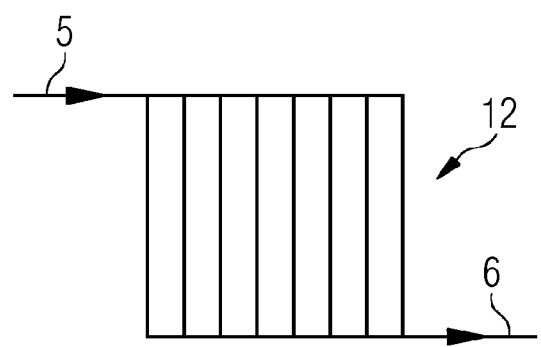

The overall design has a significantly reduced total material weight and cost by using the cooling liquid pipes to flow cooling fluid directly adjacent to the cell surface, instead of conventional cooler block, heat exchanger designs. In addition, this cooling is provided for normal operation, to keep the cell within a temperature range that is beneficial to performance and operational lifetime, rather than as a one off, only in the case of a thermal event. The cooling fluid channels 22 may be formed in any suitable form, connected between the inlet and outlet pipes 3, 7 via the tubes 5, 6. Preferably, the cross section of the channels is square to maximise the contact and minimise the amount of plastics material between the cooling fluid and the energy storage device. However, other cross sections could be used, such as circular cross section tubing. The tubing 23 may be in the form of a continuous serpentine 11 connected between the inlet and outlet tubes 5, 6, as shown in FIG. 3a and the example of FIG. 2b, or there may be multiple parallel rows 12 of tubing fed by a common supply from the inlet pipe 3 connected to the inlet tube 5 and exiting through outlet tube 6, as shown in FIG. 3b, to outlet pipe 7.

The tubing 23 may be metal, but more typically is a synthetic material, such as polymer plastics, for example polythene, polyamide, such as PA66 plastics, or thermoplastics such as TCE2, TCE5, or other suitable materials, which may be moulded or extruded to the required shape and is able to withstand normal operating temperatures of the energy storage modules. The cell is cooled directly by flowing cooling fluid through the cooling fluid channels 22 in contact with a substantial part of the cell surface, with very little thermal resistance. Conventional cooling arrangements have suffered from hot spots for areas of the cell which were far away from the cooler block, or heat exchanger, but this laminated cooler and cell module avoids this problem. This has the effect of slowing down the aging process of the cell, so increasing its lifetime.

Figure 4:
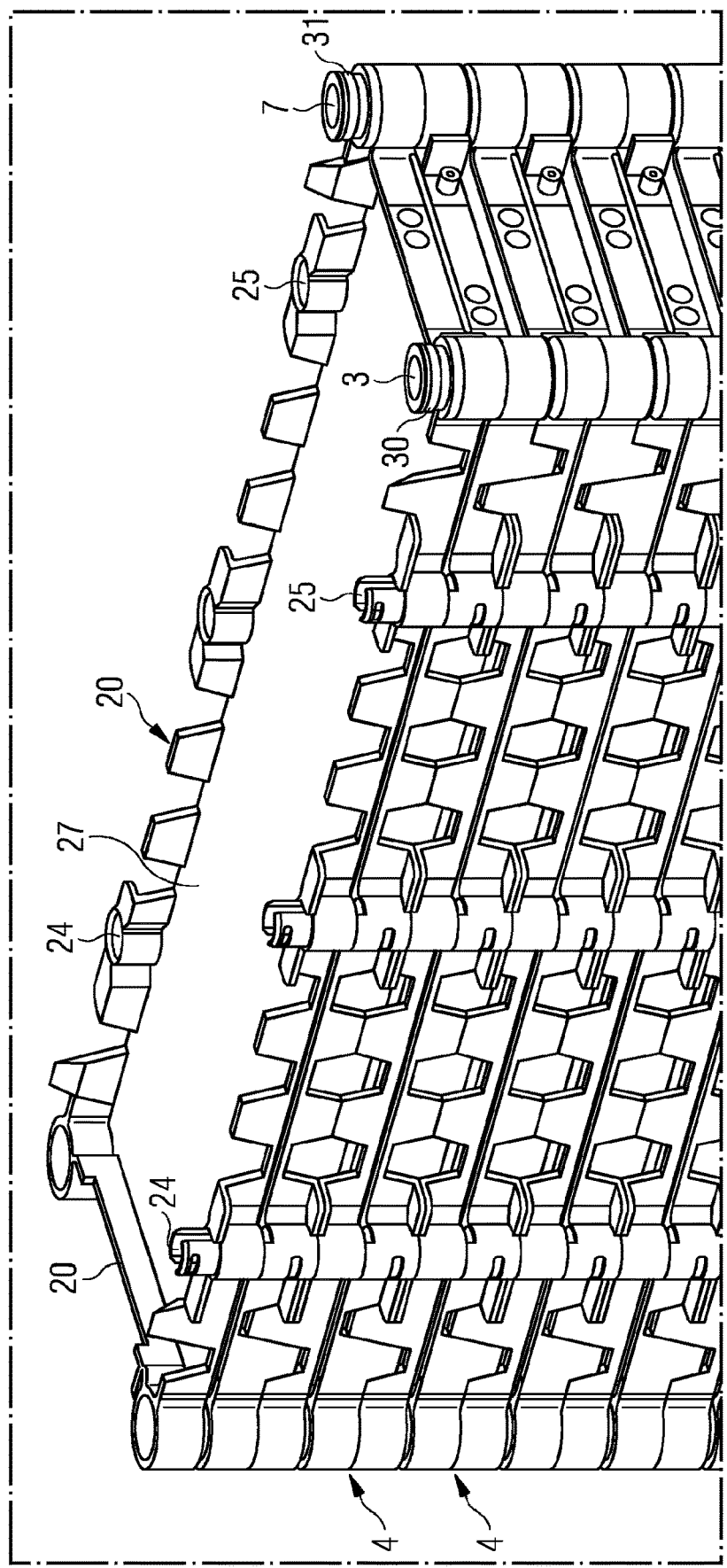
FIG. 4 illustrates how multiple energy storage device coolers may be stacked together in the cooling system of the present invention; and, FIG. 5 provides another view illustrating the stacking of multiple energy storage devices.
Figure 5:
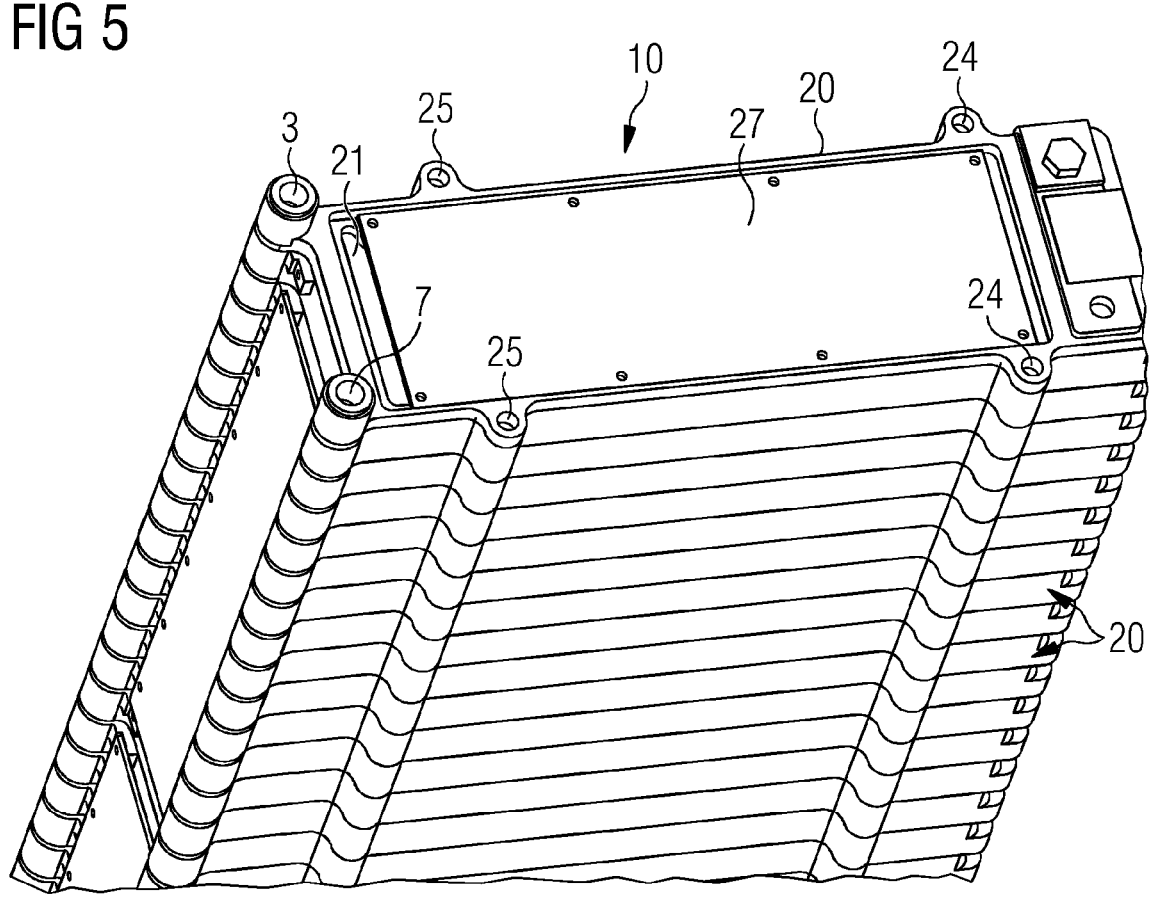

Energy storage modules 4 are formed from multiple cells stacked together on their coolers, or in their carriers 20, each cooler provided with integral cooling channels 22, as shown in FIGS. 4 and 5. Cooling fluid enters the tubes of each cooler from an opening 70 in the common inlet pipe 3 that runs along the stack and exits through an opening 71 in the common outlet pipe 7 that runs along the stack. In a closed system, the cooling fluid is pressurised and circulates around the stack of cells in the module via the common pipes 3, 7 and individual coolers 22 of each cell of the module 4.

The common inlet pipe 3 and common outlet pipe 7 of the stack are formed with pipe connections, illustrated as washers 30, 31, between each adjacent carrier of the stack. The washers 29, 30 of the inlet pipe 3 comprise a flame retardant material, which may be chosen to be effective up to at least 400° C. for at least 10 s, advantageously up to 500° C., so in the event of thermal runaway and ignition of a cell, the washers remain intact, ensuring that cooling water continues to be supplied from the cooling unit 1, along the inlet pipe. However, the washers 28, 31 of the outlet pipe 7 on the outlet side may be made from a material that melts at a relatively low temperature when subjected to heat or flames, the temperature being above the safe operating temperature of the cells, i.e. above 60° C., but typically in the range of 130° C. to 180° C. and advantageously below 150° C. In normal operation, the pipe connections 30, 31 at the inflow and outflow side are both intact, so the cooling fluid flows in parallel through all of the coolers of all of the cells at an equal flow rate, or equal volume. There may be a pressure difference between points 30 and 31 due to the flow through the cooling channels. In this example, the pressure of the closed system is set to be above ambient pressure.

However, if the pipe connection 31 on one of the outflows fails, for example, when the pipe connection melts due to thermal runaway occurring, then the now much lower pressure where that connection has failed makes that the path of least resistance and all of the water flow tries to go towards that opening, rather than being shared amongst all the coolers of all the cells. The consequence of this is that, for a short time, until the no longer closed system runs out of water, a very substantial volume of water is provided through the cooler of that cell in a relatively short time, taking more heat away more quickly than in standard operation. Unlike the prior art systems referenced above, the present invention retains the benefit of cooling the cell surface by close contact of the cooling channels to the cell surface, even when a pipe connection fails. Thus, the substantial increase in heat removal is applied over the whole of the cell surface, rather than limited parts close to the supply. Furthermore, a pipe connection between cell carriers may be replaced once the fire has been brought under control, allowing the battery stack to be put back into operation more quickly. Generally, it is more efficient for the module to be removed for maintenance and replaced with a complete new one initially, even if the pipe connections are subsequently replaced in the removed module.

The invention keeps the advantage that the cooler 22 for each cell of the module transfers developed heat directly to the cooling liquid through the whole cell surface, on at least one side of the cell, whilst allowing for a short term, but substantial increase in cooling if required. The developed heat is transferred directly to the cooling liquid through the whole cell surface giving very effective cooling, reducing the temperature difference between cell and coolant. The invention ensures flowing water in the coolers in the event that a given point of the system is opened up, as there is a certain pressure in the module.

Another feature which may be added to a cooler according to the present invention is the provision of rupture sections within the cooler channels themselves, which rupture if they are subjected to a temperature above a predetermined temperature, for a set period of time, in order to provide cooling fluid directly to the cell surface at the point of rupture. The rupture sections are chosen to have a lower melting point than the rest of the cooling fluid channels, so that the cooling fluid is provided directly to an energy storage device in the event of the temperature exceeding the lower melting point. This provides additional protection against transfer of heat from a cell undergoing a thermal event to neighbouring cells, but after the event has been brought under control, the module would need to be removed for repair.

Figure 6:
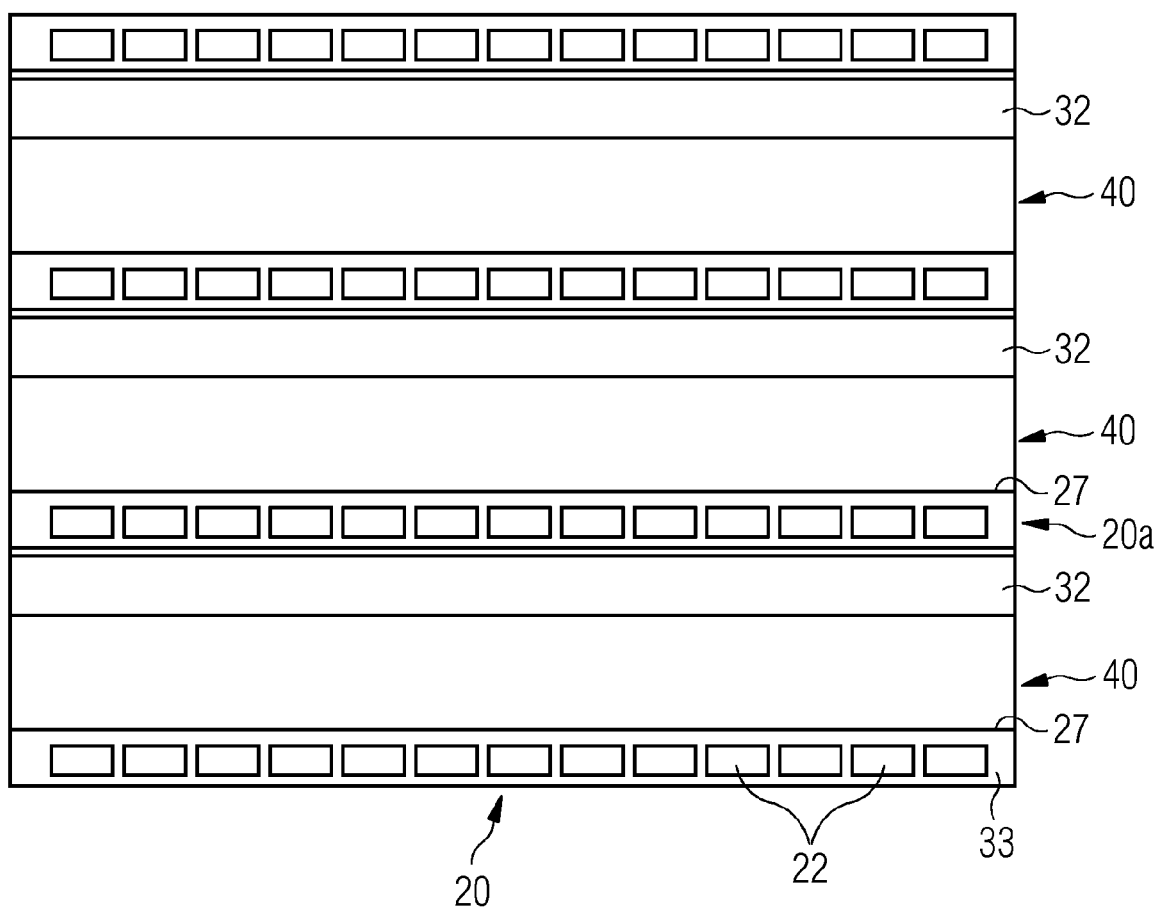
FIG. 6 shows more detail of part of the stack of FIGS. 4 and 5.

More detail of the stack of carriers and energy storage devices forming the module is shown in FIG. 6. An energy storage device 40, in this example, a battery cell, is mounted to the one surface 27 of the cooler 20 with one surface of the cell 40 in contact with the outer surface of the cooling channels 22 of the cooler 20. The other surface may be provided with a flexible sheet 32 between that surface of the battery cell 40 and a surface of an adjacent cooler 20a in a stack of the type shown in FIG. 4 or 5. This flexible sheet 32 allows the cell to swell over time, yet still allows the carrier, or cooler 20, to maintain compression on the cell mounted within it or on it. The sheet of flexible material increases thermal contact between the cell and the surface 27 of its cooler 20, when placed between the cell and the cooler on one side. Such a material applies a low pressure, typically below 0.2 bar, on the cell wall to increase performance and lifespan and accepts swelling due to normal operation and degradation during the complete life of the cell. The coolers 20 are mounted on one another and fixed together via fittings, such as bolts in fittings 24, 25. Between each water inlet section 3 and outlet section 7 on each cooler 20, a spacer, or washer 29, 28 may be provided.

The cooling system may be operated such that the time for which the additional cooling is provided, to the cooler in which the outlet pipe connection has failed, is increased over that available simply from the cooling fluid reservoir of the closed circuit system. In normal operation, cooling fluid is circulated via the inlet and outlet pipes 3, 7 to the cooling channels 22 of the coolers 20 of each cell of the energy storage module 4. In the event of an outlet pipe connection 31 melting and a consequential pressure drop being detected by a controller of the cooling unit 1 and if the closed circuit cooling unit has access to an alternative source of cooling fluid, such as a mains water supply, or a fire hydrant, then the controller in the cooling unit may respond to the detected pressure drop in the system. For example, after a predetermined time, during which the cooling fluid reservoir is emptied, the cooling unit may connect the reservoir, or cooling unit, to the alternative cooling fluid. The controller may be set to only connect to the alternative supply for a limited time period to prevent all of the energy storage units from being swamped by the cooling fluid that exits through the failed pipe connector.

The direct contact of cooler and cell in the modules makes the cooling more effective than air cooling, or conductive fins with water cooling, so reducing the temperature difference between cell and coolant in normal operation. This cooling method works with asymmetric cooling, meaning that only one side is cooled and thermal insulation may be used to prevent heat propagation on the other side, so that the other side is completely thermally isolated in case of a thermal runaway. The method also works with stacking the integral cells and coolers as shown in FIGS. 4 and 5, without thermal insulation on one side, allowing the opposite surface of the cell to be cooled by the cooler of the neighbouring cell in the stack. In this case, either an extra cooler, or a single layer of thermal insulation at one end may be used to cater for the cells without two neighbours. The low difference in temperature between cell surface and cooling fluid is due to the low thermal resistance between the cooling fluid and the cell. The only resistance is over the plastic material, which typically comprises a thermoplastic with up to 1 W/mK thermal conductivity. The stacking arrangement using one cooler to cool two adjacent cells helps to reduce weight and material cost.

Another benefit of the direct contact over the surface of the cell, is that this allows the operating temperature of the cooling liquid to be increased, thereby reducing the likelihood of condensation occurring inside the system. The use of polymer plastics materials for the cooler, rather than metal allows weight and cost to be reduced to a fraction of the conventional solutions. In addition, the modules no longer require a cooler block or heat exchanger, as is required with conventional air or water cooled systems, so the volumetric footprint can be reduced. This is particularly useful for marine and offshore applications, where space is at a premium. Direct heat transfer from the cell to the cooling fluid is made possible by constructing the cooling channels from tubes of a polymer material, the tubes having a sufficiently thin wall that thermal conductivity of the material is not a significant consideration. This allows a much wider choice of material to be used, so that weight and cost reduction can also be addressed.

Although the detailed examples have been described with respect to electrochemical cells, such as batteries, for example Li-ion, alkaline, or NiMh batteries, or others, the invention also applies to other types of stored energy units, in particular non-cylindrical capacitors, ultracapacitors, or supercapacitors, fuel cells, or other types of energy storage which have a surface that can be cooled by a cooler and which may also suffer if the temperature of modules of the stored energy units regularly goes outside an advantageous operating range, reducing the overall lifetime and increasing maintenance costs. For a vessel, or system, relying on stored energy as its primary, or only power source, reliability is particularly important and optimising operating conditions is desirable.

The invention claimed is:

1. An energy storage module cooling system for a power supply system comprising one or more energy storage modules arranged in parallel; the cooling system comprising:
   a cooling unit comprising a cooling fluid reservoir, a common cooling fluid inlet pipe and a common cooling fluid outlet pipe;
   wherein each energy storage module comprises one or more energy storage devices; and for each energy storage device, a cooler in contact with the energy storage device;
   wherein the cooler comprises one or more cooling fluid channels for circulating cooling fluid, the channels being in contact with a surface of the energy storage device, each cooling fluid channel being adapted to receive cooling fluid, extract heat from the energy storage device and return the cooling fluid to the cooling unit; and wherein the common cooling fluid inlet pipe and common fluid outlet pipe comprise pipe connections between each energy storage device cooler;
   wherein the pipe connections of the common cooling fluid outlet pipe have a lower melting point than pipe connections of the common cooling fluid inlet pipe.

2. The cooling system according to claim 1, wherein the melting point of the pipe connections of the common cooling fluid inlet pipe is greater than 400° C.

3. The cooling system according to claim 1, wherein the melting point of the pipe connections of the common cooling fluid outlet pipe is in the range of 130° C. to 180° C.

4. The cooling system according to claim 1, wherein the cooler is formed by lamination, additive manufacturing techniques, or welding.

5. The cooling system according to claim 1, wherein the cooling fluid channels comprise a circular or square cross section.

6. The cooling system according to claim 1, wherein the cooling fluid channels comprise a polymer material.

7. The cooling system according to claim 1, wherein the cooling fluid channels have a wall thickness of no more than 3 mm.

8. The cooling system according to claim 1, wherein at least 30% of one surface of the energy storage device is in direct contact with the cooling fluid channels of the cooler.

9. The cooling system according to claim 1, wherein at least 75% of one surface of the energy storage device is in direct contact with the cooling fluid channels of the cooler.

10. The cooling system according to claim 1, wherein the cooling fluid channels further comprise one or more rupture sections, the rupture sections having a lower melting point than the melting point of the cooling fluid channels, whereby cooling fluid is provided directly to an energy storage device in the event of the temperature exceeding the lower melting point.

11. The cooling system according to claim 1, wherein the energy storage device comprises one of an electrochemical cell, a battery cell, a fuel cell, capacitor, ultracapacitor, or supercapacitor.

12. The cooling system according to claim 1, wherein the energy storage device comprises a Li-ion battery.

13. The cooling system according to claim 1, wherein the cooling fluid comprises water or water glycol.

14. A method of supplying additional cooling to an energy storage module of a cooling system according to claim 1, the method comprising:

providing pipe connections of the common cooling fluid outlet pipe that have a lower melting point than pipe connections of the common cooling fluid inlet pipe;

such that in use, if the pipe connections are subjected to elevated temperatures, or fire, the pipe connections of the common fluid outlet pipe fail before the pipe connections of the common fluid inlet pipe, causing a pressure drop whereby the rate of fluid flow through the cooler of the energy storage module in which the pipe connection has failed is substantially increased.

15. The method according to claim 14, wherein the method further comprises:

detecting in the cooling unit a pressure drop in the closed system and switching from the cooling fluid reservoir to an additional cooling fluid source to maintain the supply of cooling fluid for a longer period.

16. The method according to claim 15, wherein the additional cooling fluid source is switched off after a predetermined time period.

* * * * *